United States Patent
Zhang et al.

(10) Patent No.: US 11,199,842 B2
(45) Date of Patent: Dec. 14, 2021

(54) DETERMINING DRIVING PATHS FOR AUTONOMOUS DRIVING USING PARALLEL PROCESSING

(71) Applicant: Baidu USA LLC, Sunnyvale, CA (US)

(72) Inventors: Liangliang Zhang, Sunnyvale, CA (US); Dong Li, Sunnyvale, CA (US); Jiangtao Hu, Sunnyvale, CA (US); Jiaming Tao, Sunnyvale, CA (US); Yifei Jiang, Sunnyvale, CA (US); Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 642 days.

(21) Appl. No.: 16/019,245

(22) Filed: Jun. 26, 2018

(65) Prior Publication Data
US 2019/0391585 A1 Dec. 26, 2019

(51) Int. Cl.
| G05D 1/02 | (2020.01) |
| B60W 10/18 | (2012.01) |
| B60W 10/20 | (2006.01) |
| B60W 30/09 | (2012.01) |
| G05D 1/00 | (2006.01) |

(52) U.S. Cl.
CPC .......... *G05D 1/0214* (2013.01); *B60W 10/18* (2013.01); *B60W 10/20* (2013.01); *B60W 30/09* (2013.01); *G05D 1/0088* (2013.01); *G05D 1/027* (2013.01); *G05D 1/0246* (2013.01); *G05D 1/0257* (2013.01); *G05D 1/0278* (2013.01)

(58) Field of Classification Search
CPC .. G05D 1/0214; G05D 1/0257; G05D 1/0246; G05D 1/0088; B60W 30/09; B60W 10/20; B60W 10/18
See application file for complete search history.

(56) References Cited

U.S. PATENT DOCUMENTS

| 10,410,521 B2 * | 9/2019 | Madas | B60W 30/095 |
| 2012/0039186 A1 * | 2/2012 | Vasseur | H04W 40/248 370/248 |

* cited by examiner

*Primary Examiner* — Mathew Franklin Gordon
(74) *Attorney, Agent, or Firm* — Womble Bond Dickinson (US) LLP

(57) ABSTRACT

An autonomous driving vehicle (ADV) may determine a predicted path for a moving obstacle and speeds for different portions of the path. The ADV use multiple threads in parallel to determine the path and speeds for the different portions of the path.

20 Claims, 13 Drawing Sheets

DETERMINING DRIVING PATHS FOR AUTONOMOUS DRIVING USING PARALLEL PROCESSING

TECHNICAL FIELD

Embodiments of the present disclosure relate generally to operating autonomous driving vehicles. More particularly, embodiments of the disclosure relate to determining paths or routes for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Particularly, trajectory planning is a critical component in an autonomous driving system. Conventional trajectory planning techniques rely heavily on high-quality reference lines, which are guidance paths, e.g., a center line of a road, for autonomous driving vehicles, to generate stable trajectories.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment may be included in at least one embodiment of the disclosure. The appearances of the phrase "in one embodiment" in various places in the specification do not necessarily all refer to the same embodiment.

According to some embodiments, a new method for determining a path for an autonomous driving vehicle (ADV) is utilized. Various moving obstacles/objects may be located in the same geographical area where an ADV is travelling/located. These moving obstacles may move unpredictably. For example, although a pedestrian may be moving along a path, the pedestrian may suddenly change direction (e.g., turn left) or may accelerate/decelerate. This may cause problems when attempting to predict the path of the moving object in order to avoid colliding with, hitting, or striking the moving object. Thus, it may be useful to determine (e.g., calculate, compute, obtain, etc.) an area that includes possible locations where a moving obstacle may move to.

The ADV may determine a predicted area that includes possible areas where a moving obstacle may move to. The predicted area may include a large percentage (e.g., 99.7%) of the possible locations where the moving obstacle may move to. This may allow the ADV to determine and/or plan a path for the ADV that avoids the predicted area. When the ADV avoids the predicted area (where the moving obstacle may move to), this allows the ADV to increase the probability of avoiding a collision with the moving obstacle.

Figure 1:
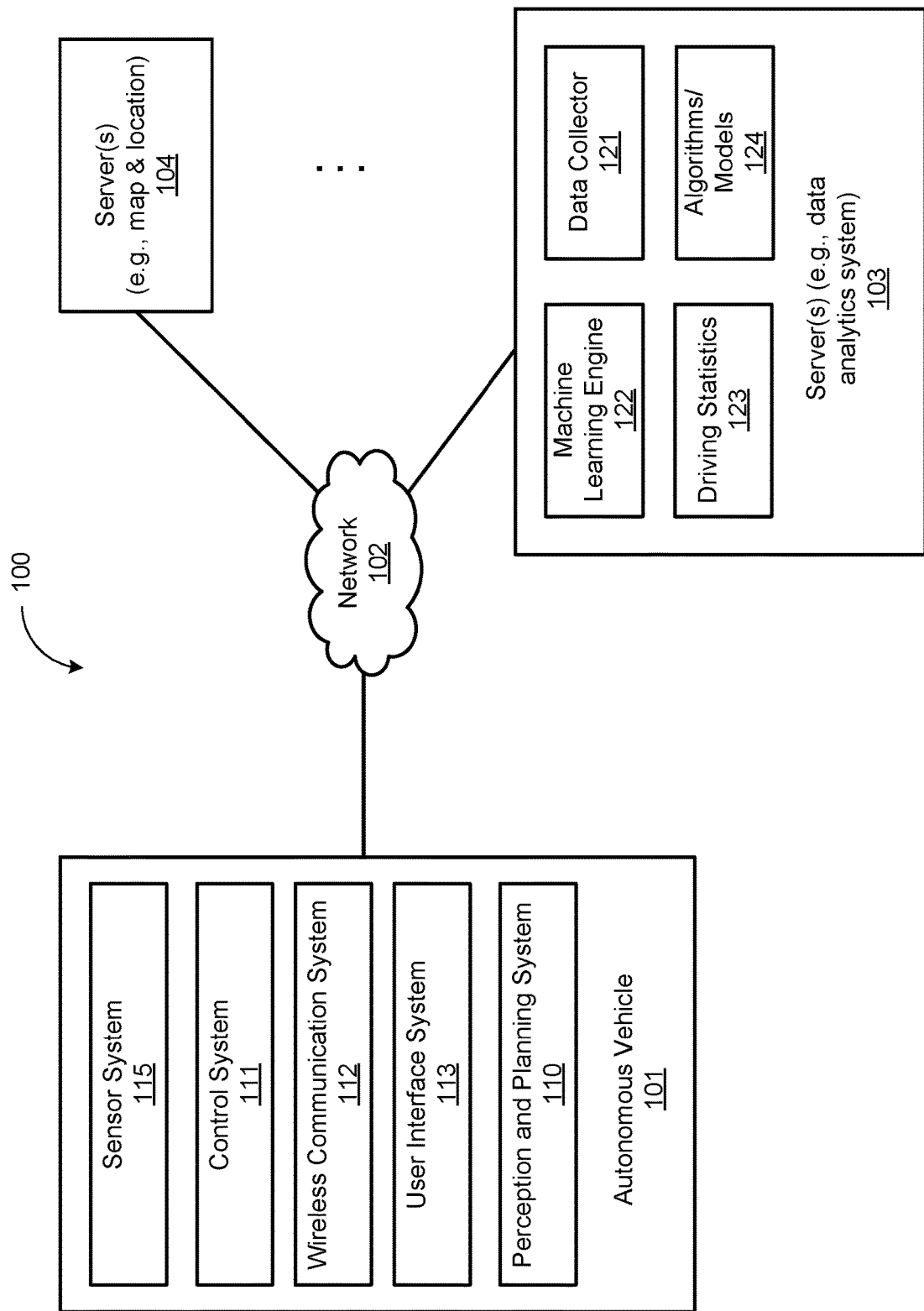
FIG. 1 is a block diagram illustrating a networked system according to some embodiments.

FIG. 1 is a block diagram illustrating an autonomous vehicle network configuration according to some embodiments of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles may be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
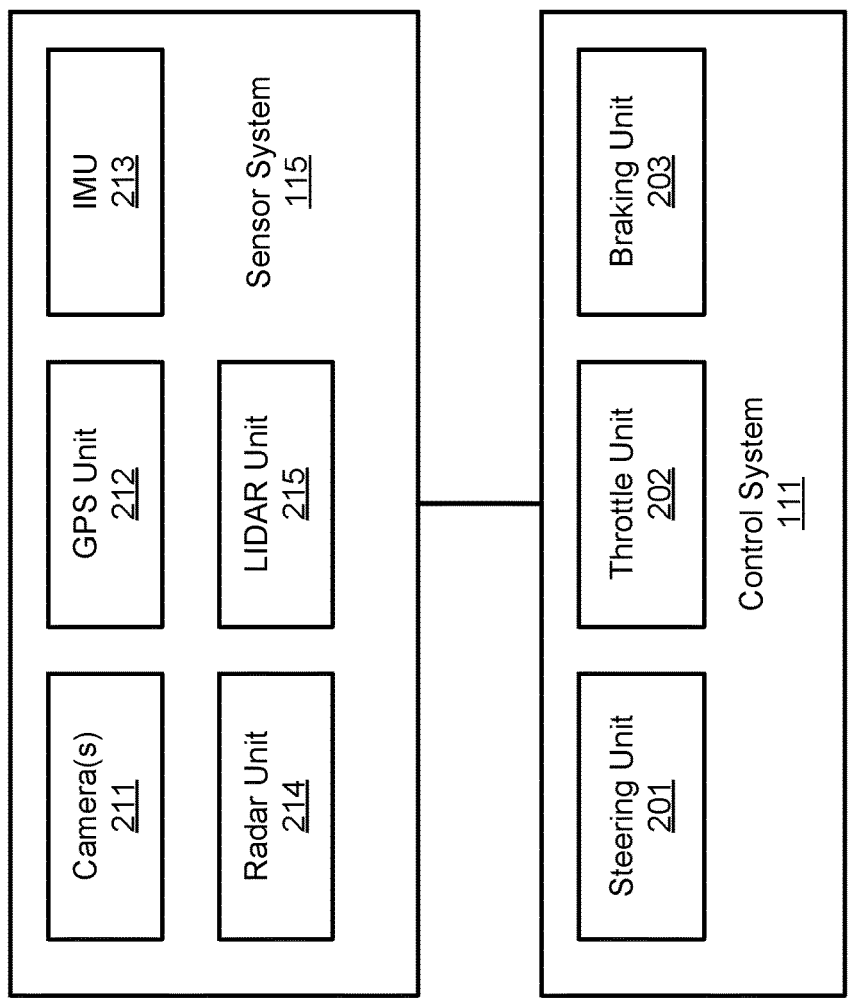
FIG. 2 is a block diagram illustrating an example of an autonomous vehicle according to some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In some embodiments, the perception and planning system 110 may not have MPOI information (e.g., map data). For example, the perception and planning system 110 may not have map data for other environments or geographical areas/locations, the perception and planning system 110 may not have map data for an environment or geographical area/location where the autonomous vehicle 101 is currently travelling or located (e.g., the perception and planning system 110 may have map data for one city but may not have map data for another city). In another example, the perception and planning system 110 may not have any map data or MPOI information (e.g., the perception and planning system 110 may not store any map data).

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of quintic polynomial functions may be selected and defined with initial coefficients or parameters. Furthermore, a set of constraints may also be defined based on the hardware characteristics such as sensors specification and specific vehicle designs, which may obtained from the driving statistics 123.

Figure 3A:
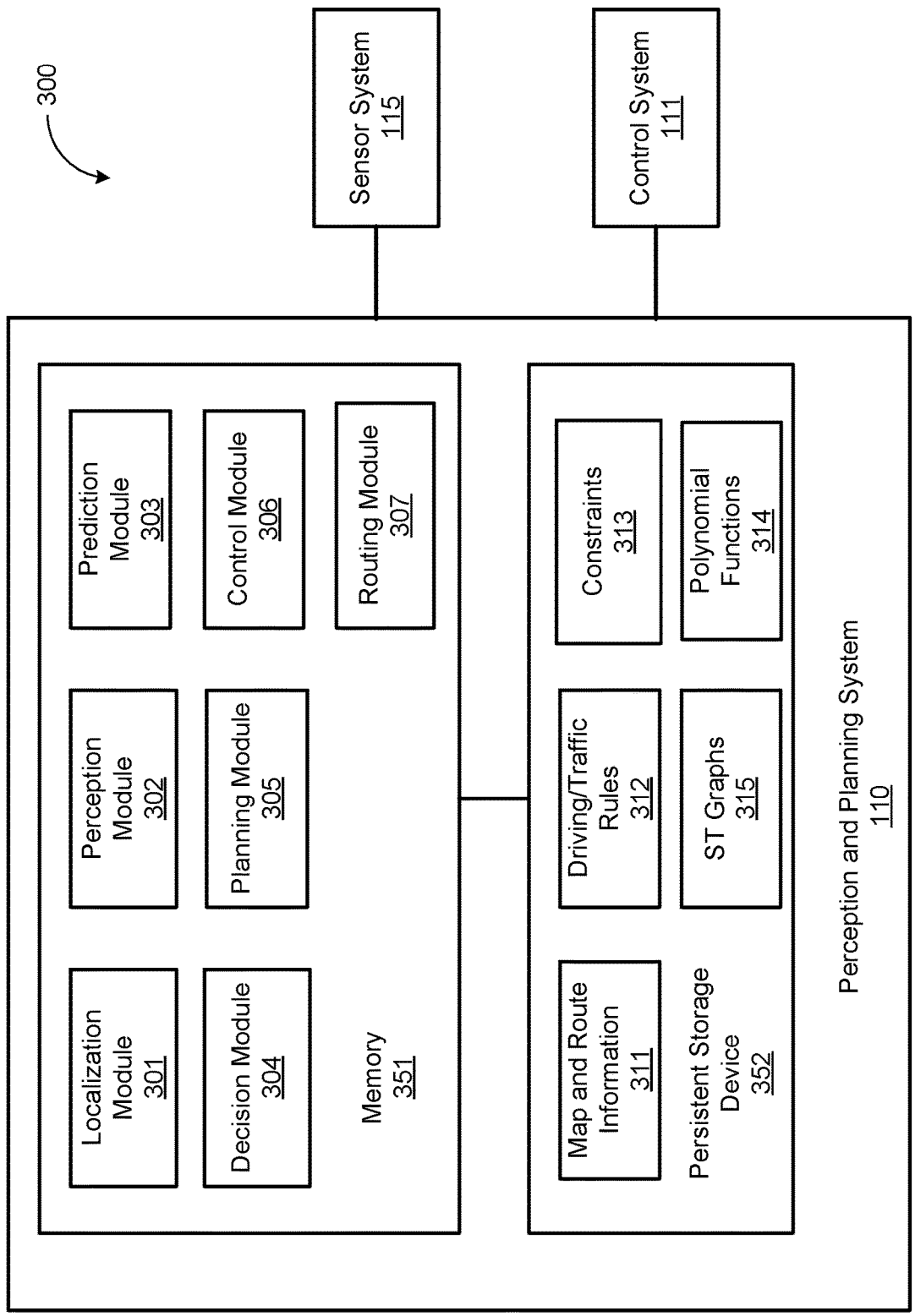
FIGS. 3A-3B are block diagrams illustrating an example of a perception and planning system used with an autonomous vehicle according to some embodiments.
Figure 3B:
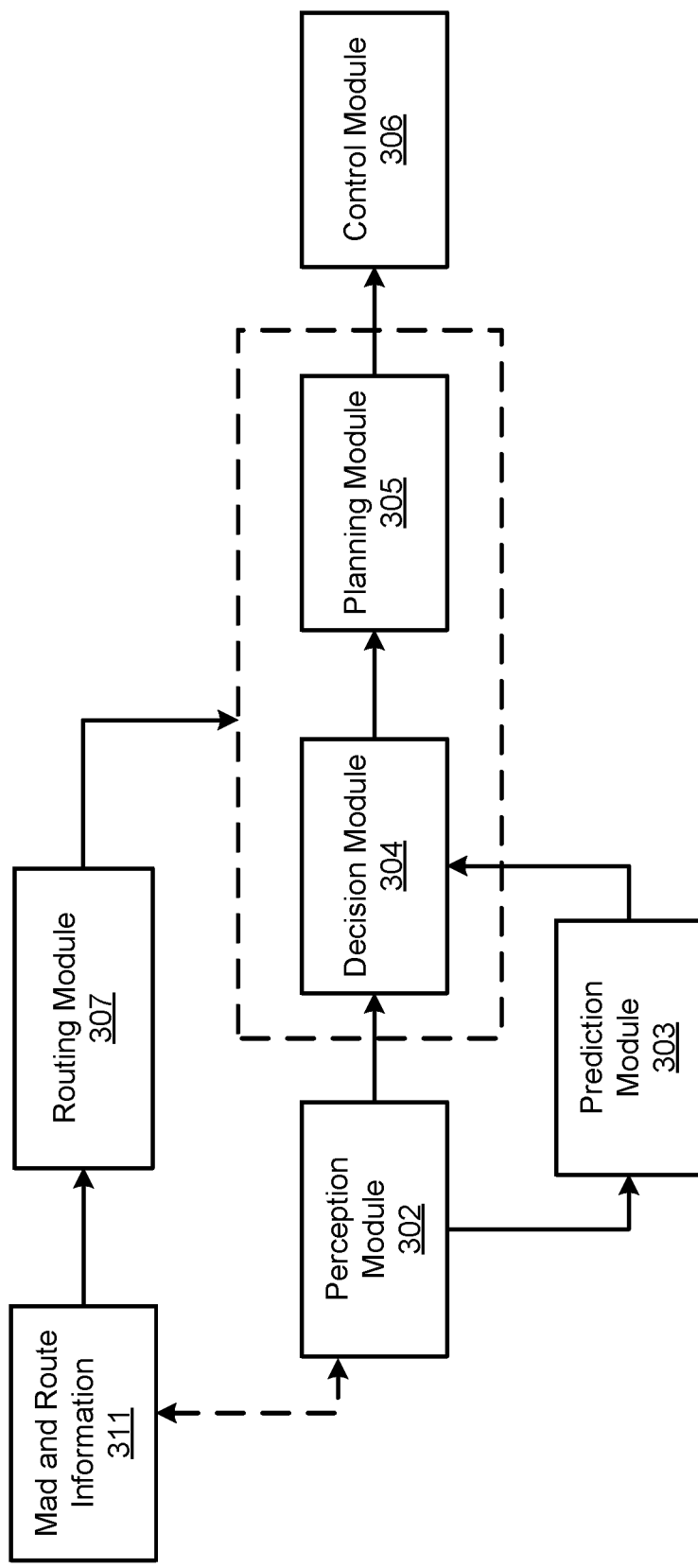

FIGS. 3A and 3B are block diagrams illustrating an example of a perception and planning system used with an autonomous vehicle according to some embodiments. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server. In one embodiment, the map and route information 311 may have been previously stored in the persistent storage device 352. For example, the map and route information 311 may have been previously downloaded or copied to the persistent storage device 352.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. In some embodiments, the map/route information 311 for an environment or geographical area/location may be generated on the fly (e.g., generated by the perception module 302) as the autonomous vehicle travels through the environment or geographical area/location, as discussed in more detail below.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Various moving obstacles/objects may move unpredictably. For example, although a pedestrian may be moving along a path, the pedestrian may suddenly change direction (e.g., turn left) or may accelerate/decelerate. This may cause problems when attempting to predict the path of the moving object in order to avoid colliding with, hitting, or striking the moving object. Thus, it may be useful to determine (e.g., calculate, compute, obtain, etc.) an area that includes possible locations where a moving obstacle may move to. This may allow the ADV to increase the probability of avoiding the moving obstacle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. In some embodiments, the map/route information 311 may be generated by the perception module 302, as discussed in more detail below. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV m exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps (which may be generated by the perception module 302 or may have been previously stored/downloaded) so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc., in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road may be divided into sections or segments {A, B, and C} to denote three road segments. Three lanes of road segment A may be enumerated {A1, A2, and A3}. A reference route is generated by generating reference points along the reference route. For example, for a vehicular lane, routing module 307 can connect midpoints of two opposing curbs or extremities of the vehicular lane provided by a map data (which may be generated by the perception module 302 or may have been previously stored/downloaded). Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Figure 4A:
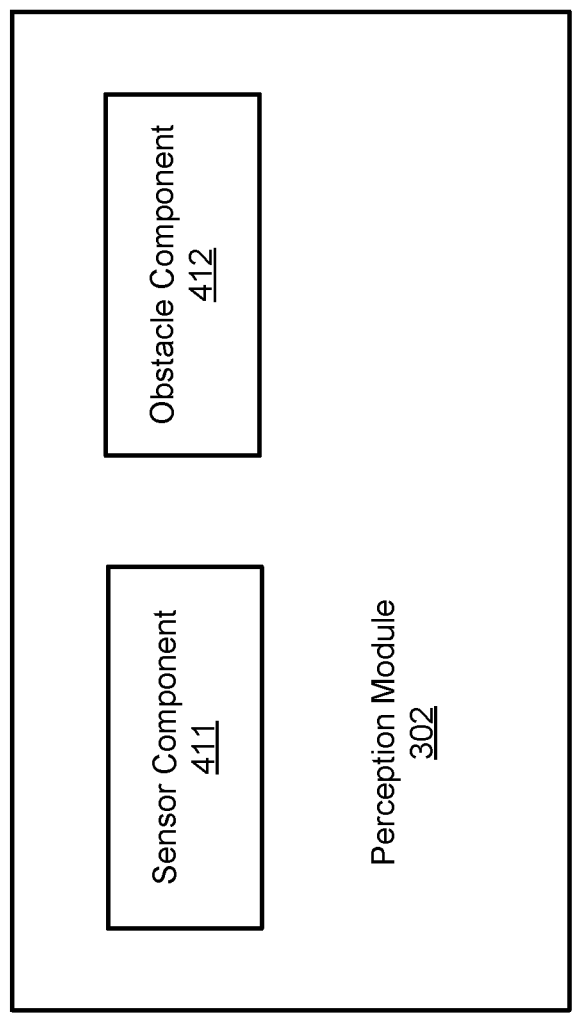
FIG. 4A is a block diagram illustrating an example of a perception module according to some embodiments.

FIG. 4A is a block diagram illustrating an example of a perception module 302 according to some embodiments. Referring to FIG. 4A, perception module 302 includes, but is not limited to, a sensor component 411 and an obstacle component 412. These components 411 through 412 may be implemented in software, hardware, or a combination thereof. The sensor component 411 may obtain sensor data from one or more sensors of an ADV. For example, the sensor component 411 may periodically request or poll for sensor data from the one or more sensors (e.g., may request sensor data from a sensor every few milliseconds, every second, or some other appropriate period of time). In another example, the sensor component 411 may listen or wait for sensor data to be received from the one or more sensors. For example, the sensor component 411 may be configured to constantly monitor buses, communication channels (wired or wireless), wires, lines, pins, traces, etc., so that the sensor component 411 is able to receive sensor data as soon as the sensor data is generated by the one or more sensors.

In one embodiment a sensor may be a camera (e.g., a digital camera, a video camera, a video recorder, etc.) or some other device that is capable of capturing or recording images. The sensor data generated by the camera and received by the sensor component 411 may be referred to as video data. Examples of video data may include but are not limited to digital images (e.g., Joint Photographic Experts Group (JPEG) images), video frames, Motion Picture Experts Group (MPEG) data, or other data that is appropriate for representing optical images captured by the camera. In another embodiment, a sensor may be a radar unit (e.g., radar unit 214 illustrated in FIG. 2) or some other device that is capable of determining the location, range, angle, and/or velocity of objects around the ADV using radio waves (e.g., radio-frequency waves or signals). The sensor data generated by the radar unit may be referred to as radar data. Radar data may be data that may indicate the location, range, angle, and/or velocity of objects detected by the radar unit. In a further embodiment, a sensor may be a LIDAR unit (e.g., LIDAR unit 215 illustrated in FIG. 2) or some other device that is capable of determining the location, range, angle, and/or velocity of objects around the ADV using light (e.g., laser light). The sensor data generated by the LIDAR unit may be data that may indicate the location, range, angle, and/or velocity of objects detected by the LIDAR unit. In other embodiments, other types of sensors may generate other types of sensor data which may be provided do the sensor component 111. Any type of sensor that may be used to detect the location, range, angle, and/or velocity of objects (e.g., pedestrians, vehicles, barricades, obstacles, barriers, lane lines, signs, traffic lights, etc.) in the environment or geographical location/area may be used in the embodiments, implementations, and/or examples described here. In another embodiment, a sensor may be a GPS receiver or unit (e.g., GPS unit 212 illustrated in FIG. 2) or some other device capable to determining the location (e.g., physical or geographical location) of the ADV. The sensor data generated by the GPS receiver may be GPS data (which may be referred to as GPS coordinates).

In one embodiment, the sensor data may indicate information about the environment or geographical area/location in which the ADV is currently located or travelling. For example, the sensor data may indicate the locations and/or layouts of objects (e.g., pedestrians, vehicles, barricades, obstacles, barriers, lane lines, signs, traffic lights, etc.). In another example, the sensor data may indicate road conditions for the environment or geographical area (e.g., whether the road is a dry road, wet road, smooth road, bumpy road, etc.). In a further example, the sensor data may indicate weather conditions for the environment or geographical area (e.g., the temperature, whether there is rain, wind, snow, hail, etc.).

In one embodiment, the obstacle component 412 may detect one or more moving obstacles based on the sensor data obtained/received by the sensor component 411. For example, the obstacle component 412 may analyze the images or video (e.g., video data) captured by the camera to identify moving obstacles that are in the geographical area where the ADV is located/travelling. In another example, obstacle map component 412 may analyze radar data to identify moving obstacles that are in the geographical area where the ADV is located/travelling. In a further example, the obstacle component 412 may analyze LIDAR data to identify moving obstacles that are in the geographical area where the ADV is located/travelling.

In one embodiment, the map component 412 may use various techniques, methods, algorithms, operations, etc., to generate the identifying moving obstacles based on the sensor data. For example, the map component 412 may use image or video processing/analysis techniques or algorithms to identify moving obstacles based on the video data. In another example, the map component 412 may use various object detection techniques or algorithms identify moving obstacles based on radar and/or LIDAR data. The examples, implementations, and/or embodiments described may use various types of sensor data and/or various functions, techniques, methods, algorithms, operations, etc., to identify moving obstacles. For example, the map component 412 may use machine learning, artificial intelligence, statistical models, neural networks, clustering techniques, etc.

Figure 4B:
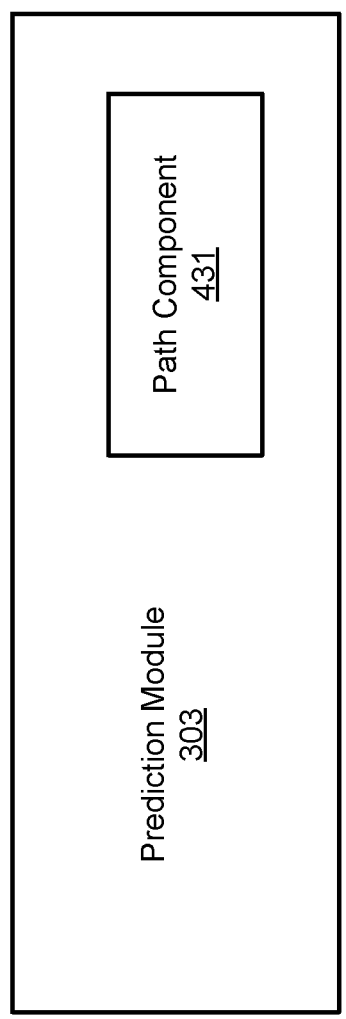
FIG. 4B is a block diagram illustrating an example of a prediction module according to some embodiments.

FIG. 4B is a block diagram illustrating an example of a prediction module 303 according to some embodiments. Referring to FIG. 4B, the prediction module 303 includes, but is not limited to, a path component 431, a variation component 432, and an area component 433. These modules 431-433 may be implemented in software, hardware, or a combination thereof. Reference line generator 435 is configured to generate a reference line for the ADV. As discussed above, the perception module 302 (illustrated in FIGS. 3A, 3B, and 4A) may detect a moving obstacle within a geographical area where the ADV is located. For example, the perception module 302 may detect a pedestrian that is walking in a street/road where the ADV is located/travelling. In another example, the perception module 302 may detect a bicyclist that is riding in a street/road where the ADV is located/travelling. The perception module 302 may detect a moving obstacle based on the sensor data (e.g., video data, radar data, LIDAR data, etc.) generated by one or more sensors (e.g., a video camera, a radar unit, a LIDAR unit, etc.), as discussed above.

In one embodiment, the path component 431 may determine a path for a moving obstacle. As discussed above, the perception module 302 may detect a moving obstacle (e.g., a pedestrian, a bicyclist, etc.) geographical area where the ADV is located/travelling, based on sensor data. The path component 431 may determine a path that the moving obstacle may travel on or take based on the sensor data. The path that the moving obstacle may travel may be referred to as a predicted path, an estimated path, a possible path, etc.

In one embodiment, the path component 431 may determine the predicted path for a moving obstacle by determining a set or a plurality of predicted points in the geographical area with the ADV is located/travelling. For example, the path component 431 may use a Kalman filter to determine the set/plurality of predicted points. A Kalman filter may use a series of measurements observed over time to produces estimates or predictions of unknown variables. A Kalman filter may also estimate a joint probability distribution over the variables for each timeframe. A Kalman filter may be referred to as a linear quadratic estimation (LQE). Although the present disclosure may refer to a Kalman filter, various other filters, algorithms, methods, functions, operations, processes, etc., may be used to determine the set/plurality of predicted points in other embodiments.

In one embodiment, the path component 431 may define and/or generate one or more polynomial functions (e.g., a quintic polynomial, a cubic polynomial, etc.) to represent or model the predicted path of the moving obstacle. For example, a polynomial function may define a line on an X-Y plane that includes the predicted points (e.g., the predict points are on the line defined by the polynomial function and the line represents the predicted path). The one or more polynomial functions may also be generated, determined, calculated based on various boundaries or constraints. The boundaries or constraints may be preconfigured and/or stored as a part of constraints 313 illustrated in FIG. 3A. The polynomial functions used by the path component 431 may be preconfigured and/or stored as a part of functions polynomial functions 314 illustrated in FIG. 3A.

Figure 4C:
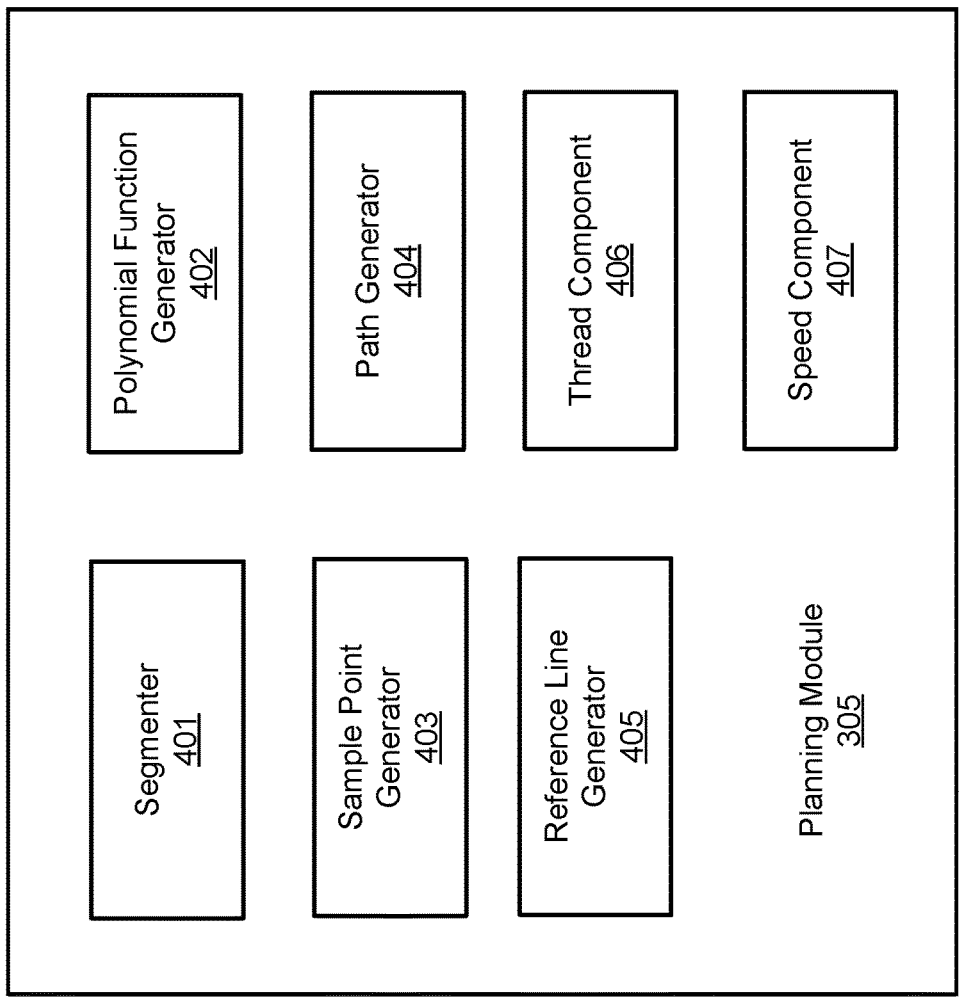
FIG. 4C is a block diagram illustrating an example of a planning module according to some embodiments.

FIG. 4C is a block diagram illustrating an example of a planning module 305 according to some embodiments. Referring to FIG. 4C, planning module 305 includes, but is not limited to, a segmenter 401, a polynomial function generator 402, a sample point generator 403, a path generator 404, a reference line generator 405, a thread component 406, and a speed component 407. The segmenter 401, the polynomial function generator 402, the sample point generator 403, the path generator 404, the reference line generator 405, the thread component 406, and the speed component 407 may be implemented in software, hardware, or a combination thereof. Reference line generator 405 is configured to generate a reference line for the ADV. As discussed above, the reference line may be a guidance path, e.g., a center line of a road, for the ADV, to generate stable trajectories. The reference line generator 405 may generate the reference line based on map and route information 311 (illustrated in FIGS. 3A and 3B). As discussed above, the map and route information 311 may be preexisting map data (e.g., map data that was previously downloaded or stored). In one embodiment, the reference line generator 405 may generate the reference line based on a predicated area and/or a predicted path determined (e.g., generated, calculated, computed, etc.) by the prediction module 303. The reference line generator 405 may generate a reference line that avoids the predicted area and/or the predicted path. For example, when represented on an X-Y plane, the reference line may not cross over/through the predicted area and/or the predicted path.

Segmenter 401 is configured to segment the reference line into a number of reference line segments. The reference line may be divided into reference line segments to generate discrete segments or portions of the reference line. For each of the reference line segments, polynomial function generator 402 may be configured to define and generate a polynomial function to represent or model the corresponding reference line segment. The sample point generator 403 may generate sample points based on the reference line. For example, the sample point generator 403 may generate one or more sets of sample points (e.g., groups of one or more sample points) that are may generally follow the reference line, as discussed in more detail below. In one embodiment, the sample point generator 40 may generate the one or more sets of sample points based on a predicated area and/or a predicted path determined (e.g., generated, calculated, computed, etc.) by the prediction module 303. The sample point generator 403 may generate sets of sample points that avoid the predicted area and/or the predicted path. For example, when represented on an X-Y plane, the sets of sample points may not be located within the predicted area and/or may not be located on the predicted path.

The polynomial function generator 402 may connect the multiple sets of sample points to each other. For example, the polynomial function generator 402 may generate one or more segments (e.g., connections) between each sample point in a set of sample points and each sample in the next adjacent set of sample points, as discussed in more detail below. The polynomial function generator 402 may also generate, calculate, determine, etc., one or more polynomials that may be used to represent the segments between the sample points. For example, the polynomial function generator 402 may generate, determine, calculate, etc., a polynomial function for each segment between two sample points. The polynomial functions that represent the segments may also be generated, determined, calculated based on various boundaries or constraints. The boundaries or constraints may be preconfigured and/or stored as a part of constraints 313 illustrated in FIG. 3A. The polynomial functions used by the planning module 305 (e.g., used by the polynomial function generator 402) may be preconfigured and/or stored as a part of functions polynomial functions 314 illustrated in FIG. 3A.

The path generator 404 may determine a path for the ADV based on the segments between the sample points, as discussed in more detail below. For example, the path generator 404 may determine a cost for each segment. The cost may be based on various factors or parameters including, but not limited to, how far away the segment is from the reference line, how far away the sample points in the segment are from the reference line, the curvature change rate for a segment or for sample points in the segment, the curvature of a segment, obstacles (e.g., a vehicle, a pedestrian, an obstruction, etc.) that may be located at a sample point, etc. The costs may also be referred to as weights. The path generator 404 may identify or select the segments that form a path which has the lowest total cost (lowest total weight).

In one embodiment, the speed component 407 may determine the speed for the path (determined by the path generator 404) or for one or more portions of the path. For example, the path may include multiple portions or segments. The speed component 407 may determine a speed for the ADV for each portion/segment of the path. This may allow the speed component 407 to determine the speed that should be used by the ADV for the portion of the path.

In one embodiment, the speed component 407 may determine the plurality of speeds that may be used by the ADV for a portion of the path. For example, the speed component 407 may determine the maximum speed of the minimum acceleration/speed for the ADV. The maximum or minimum speed for the ADV may be based on the physical capabilities or constraints of the ADV (e.g., max acceleration/speed may be based on the power of the engine of the ADV). The speed component 407 may identify a set of speeds between the maximum and minimum speed. For example, the speed component 407 may identify a set of speeds that are evenly distributed between the maximum and minimum speed. In another example, the speed component 407 may identify a set of speeds (between the maximum and minimum speed) based on various other factors such as road conditions (e.g., wet roads, slipper roads, etc.), traffic conditions (e.g., the speed of obstacles or vehicles that are around the ADV), traffic rules (e.g., the speed limit), user preferences (e.g., speeds preferred by the user), etc.

In one embodiment, the speed component 407 may determine a plurality of speed costs for each of the plurality of speeds that were determined for the portion of the path. For example, the speed component 407 may determine a velocity cost, an acceleration cost, and a smoothness cost for each speed of the plurality of speeds. The speed component 407 may add the velocity cost, the acceleration cost, and the smoothness cost for a speed to determine the speed cost for the speed. In one embodiment, the speed component 407 may determine the speed costs for each of the plurality of speeds based on one more S-T graphs, as discussed in more detail below. The S-T graphs that are generated and/or used by the speed component 407 may be stored in ST graphs 315 illustrated in FIG. 3A.

In one embodiment, the velocity cost may be a value or data indicating a cost for the ADV to travel at a respective speed. For example, a user/passenger of the ADV may have a preferred speed (e.g., 65 miles per hour) when travelling on a highway. The user/passenger may prefer not to travel at a speed that is higher than the preferred speed and the velocity cost for the higher speed may be higher. In another example, the ADV may be aware of the speed limit in the geographical area or location where the ADV is located/travelling based on map data for the geographical area or location. A speed that is higher than the speed limit may be assigned a higher velocity cost and vice versa. In another example, the ADV may detect obstacles (e.g., moving or stationary obstacles) around the ADV. Speeds that may cause the ADV to come close to (e.g., within a threshold distance) or hit an obstacle may be assigned a higher velocity cost, and vice versa. A higher velocity cost may indicate more negative effects for the ADV to travel at a respective speed and a lower velocity cost may indicate less negative effects (or no negative effects) for the ADV to travel at the respective speed.

In another embodiment, the acceleration cost may be a value or data indicating a cost to accelerate to a respective speed. For example, if the ADV is currently travelling at a lower speed, changing to a higher speed (for a portion of the path) may result in a larger acceleration for the ADV. Different accelerations may affect the ADV in different ways. For example, a larger acceleration may increase gas consumption (for a gas or hybrid ADV) or electricity consumption (for an electric or hybrid ADV). In another example, a larger acceleration may cause extra stress, strain, etc., to an engine or motor of the ADV. A higher acceleration cost may indicate more negative effects for accelerating to a respective speed and a lower acceleration cost may indicate less negative effects (or no negative effects) to accelerate to the respective speed.

In a further embodiment, the smoothness cost may be a value or data indicating a cost to the smoothness of the motion of the ADV for a respective speed. For example, if the ADV is currently travelling at a lower speed, accelerating to a higher speed may cause the ADV to jerk forward which may cause passengers in the ADV to experience a bumpier or jerkier ride (e.g., move forward and/or move to the side). In another example, if the ADV is currently travelling at a higher speed, a decelerating to a lower speed may cause the passengers in the ADV to move forward and/or to the side which may cause passengers in the ADV to experience a bumpier or jerkier ride. A higher smoothness cost may indicate more negative effects to the smoothness of the movement of the ADV for a respective speed and a lower smoothness cost may indicate less negative effects (or no negative effects) to the smoothness of the movement of the ADV for the respective speed.

In one embodiment, the thread component 406 may initiate execution of one or more threads (e.g., may spawn or allocate one or more threads). A thread may be a unit of execution that may be managed by a scheduler of a computing system or operating system. The one or more threads may be part of a process that is executed by a process or an ADV. The one or more threads may share resources (e.g., memory) of the process. The one or more threads may allow the ADV (e.g., a processor of the ADV) to perform tasks, operations, functions, calculations, etc., in parallel, as discussed in more detail below. Although the present disclosure may refer to threads, other units of execution may be used in other embodiments. For example, light weight processes, processes, etc., may be used in conjunction with or instead of threads.

In one embodiment, the thread component 406 may manage the one or more threads. The thread component 406 may assign the one or more threads to perform various tasks, operations, functions, calculations, etc. For example, the thread component 406 may allow the segmenter 401 to use a set or a plurality of threads to generate segments that may be used in a path for the ADV, as discussed in more detail below. In another example, the thread component 406 may allow the speed component 407 to use a set of plurality of threads to determine a set of speeds for a set of portions of a path, as discussed in more detail below.

In one embodiment, the thread component 406 may also reassign one or more threads to perform different tasks, operations, functions, calculations, etc. For example, a plurality or set of threads may initially be used by the segmenter 401. The thread component 406 may reassign the plurality or set of threads to the speed component to determine one or more speeds (e.g., velocities) for one or more portions of a path for the ADV, as discussed in more detail below. In one embodiment, the thread component 406 may also terminate (e.g., deallocate) one or more threads. For example, after a thread has completed a task, the thread component 406 may terminate the thread.

Figure 5A:
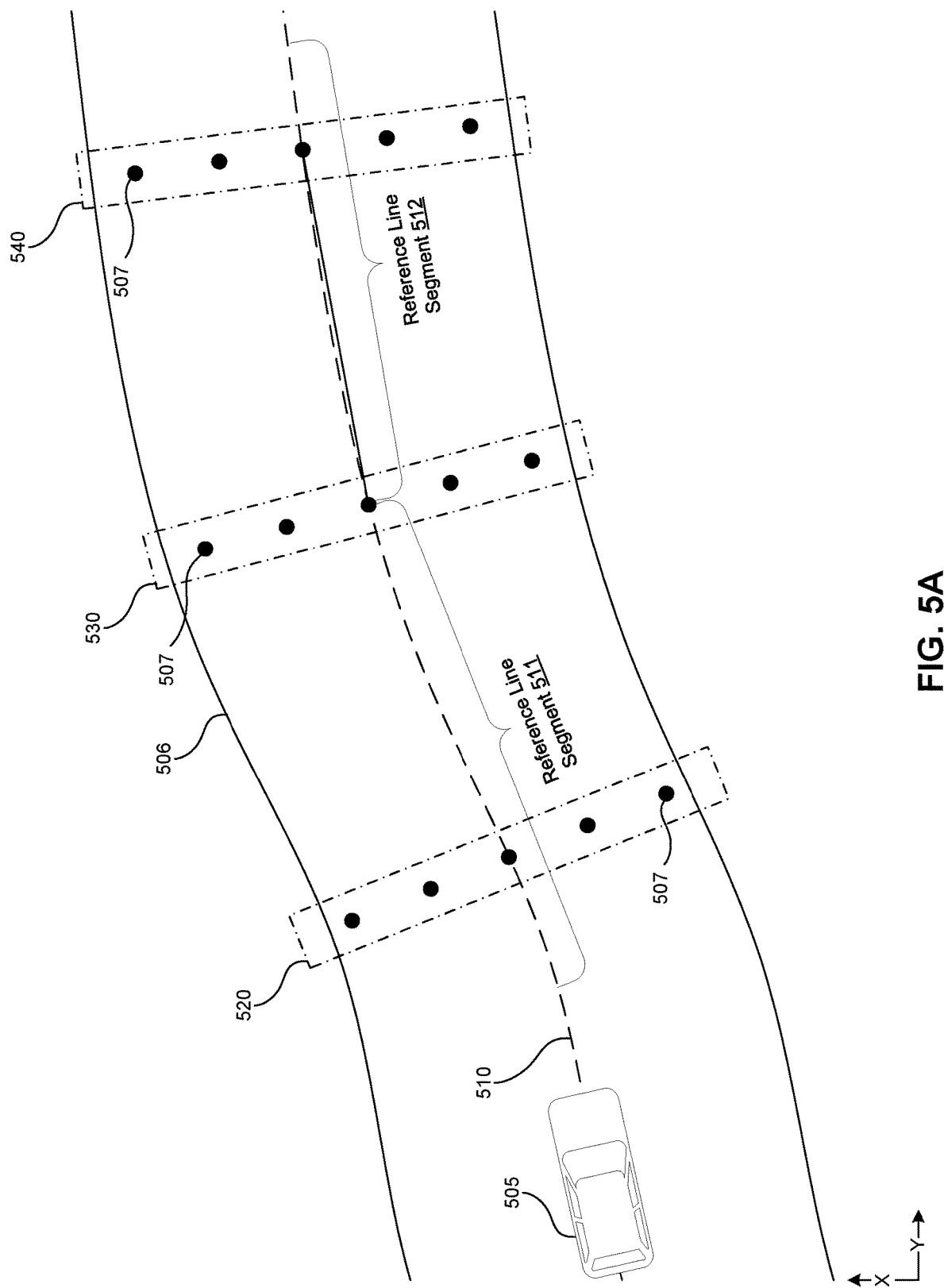
FIG. 5A is a diagram illustrating an example of an autonomous vehicle traveling down a road according to some embodiments.

FIG. 5A is a diagram illustrating an example of an ADV 505 traveling (e.g., moving, driving, etc.) down a road 506 (e.g., a street, a lane, a highway, a freeway, an expressway, etc.) according to some embodiments. As discussed above, reference line generator 405 (illustrated in FIG. 4) may generate a reference line 510. The reference line 510 may be a guidance path, e.g., a center line of the road 506 for the ADV 505. Also as discussed above, segmenter 401 (illustrated in FIG. 4) may segment (e.g., divide, split, etc.) the reference line 510 into reference line segment 511 and reference line segment 512. The sample point generator 503 may generate sample points 507 (illustrated by the black dots in FIG. 5A), as discussed above. The sample points may be grouped into groups or sets of sample points. As illustrated in FIG. 5A, the sample points 507 are grouped into three sets of sample points, set 520, set 530, and set 540. The road 506, the sample points, the reference line 510, and/or other elements illustrated in FIG. 5 may be represented using a Cartesian coordinate system as illustrated by the X axis and Y-axis in FIG. 5A. For example, the location of the ADV 505 may be represented using an X-Y coordinate. In another example, a sample point 507 may be represented using an X-Y coordinate. Although FIG. 5A (and/or FIG. 5B) illustrates two reference line segments 511 and 512, fifteen sample points 507, and sets 520, 530, and 520, different numbers of reference line segments, different numbers of sample points, different numbers of sets, different number of sample points in sets, different positions of sample points may be used in other embodiments.

In one embodiment, the reference line 510 may be represented using one or more polynomial functions. For example, the polynomial function generator 402 may generate a polynomial function that may represent reference line segment 511 and a polynomial function that may represent reference line segment 512 (e.g., the reference line segments 511 and 512 may be modeled using polynomial functions). The polynomial function generator 402 may generate one polynomial function for each reference line segment. For each of the reference line segments 511 and 512, polynomial function generator 402 may generate a polynomial function θ(s). In one embodiment, each polynomial function represents a direction of a starting reference point of the corresponding reference line segment. A derivative (e.g., the first order derivative) of the polynomial function represents a curvature of the starting reference point of the reference line segment, K=dθ/ds. A second order derivative of the polynomial function represents a curvature change or curvature change rate, dK/ds.

For the purpose of illustration, following terms are defined:
$\theta_0$: starting direction
$\dot{\theta}_0$: starting curvature, κ, direction derivative w.r.t. curve length, i.e., $$\frac{d\theta}{ds}$$

$\ddot{\theta}_0$: starting curvature derivative, i.e., $$\frac{d\kappa}{ds}$$

$\theta_1$: ending direction.
$\dot{\theta}_1$: ending curvature
$\ddot{\theta}_1$: ending curvature derivative
$\Delta s$: the curve length between the two ends Each piecewise spiral path is decided by seven parameters: starting direction (θ0), starting curvature (dθ0), starting curvature derivative (d2θ0), ending direction (θ1), ending curvature (dθ1), ending curvature derivative (d2θ1) and the curve length between the starting and ending points (Δs). In one embodiment, the polynomial function may be a quintic polynomial function. A quintic polynomial function may be defined by equation (1) (e.g., a formula, a function, etc.) as follows:

$$\theta_i(s)=a*s^5+b*s^4+c*s^3+d*s^2+e*s+f \tag{1}$$

and it satisfies $$\theta_i(0)=\theta_i \tag{2}$$

$$\dot{\theta}_i(0)=\dot{\theta}_i \tag{3}$$

$$\ddot{\theta}_i(0)=\ddot{\theta}_i \tag{4}$$

$$\theta_i(\Delta s)=\theta_{i+1} \tag{5}$$

$$\dot{\theta}_i(\Delta s)=\dot{\theta}_{i+1} \tag{6}$$

$$\ddot{\theta}_i(\Delta s)=\ddot{\theta}_{i+1} \tag{7}$$

In another embodiment, the polynomial function may be a cubic polynomial. A cubic polynomial may be defined by equation (8) as follows:

$$\theta_i(s)=a*s^3+b*s^2+c*s+f \tag{8}$$

and the cubic polynomial may satisfy the same conditions (indicated above with respect to the quintic polynomial function) illustrated by equations (2) through (7).

Based on the above constraints, the optimization is performed on all polynomial functions of all reference line segments, such that the output of a polynomial function representing reference line segment (i) at zero segment length may be the same as or similar to a direction at the starting reference point of the corresponding reference line segment (i). A first order derivative of the polynomial function may be the same as or similar to a curvature at the starting reference point of the reference line segment (i). A second order derivative of the polynomial function may be the same as or similar to a curvature change rate at the starting reference point of the reference line segment (i). Similarly, the output of a polynomial function representing reference line segment (i) at the full segment length (s) may be the same as or similar to a direction at the starting reference point of the next reference line segment (i+1), which is the ending reference point of the current reference line segment (i). A first order derivative of the polynomial function may be the same as or similar to a curvature at the starting reference point of the next reference line segment (i+1). A second order derivative of the polynomial function may be the same as or similar to a curvature change rate at the starting reference point of the next reference line segment (i+1).

For example, for reference line segment 501 as shown in FIG. 5A, an output of the corresponding polynomial function θ(0) represents a direction or angle of a starting point of reference line segment 511. θ(Δs0) represents a direction of ending point of reference line segments 511, where the ending point of reference line segments 511 is also the starting point of the next reference line segment 511. A first order derivative of θ(0) represents a curvature at the starting point of reference line segment 511 and a second order derivative of θ(0) represents a curvature change rate at the ending point of reference line segment 511. A first order derivative of θ(s0) represents a curvature of the ending point of reference line segment 511 and a second order derivative of θ(s0) represents a curvature change rate of the ending point of reference line segment 511.

By substituting the above variables $\theta_i$, $\dot{\theta}_i$, $\ddot{\theta}_i$, $\theta_{i+1}$, $\dot{\theta}_{i+1}$, $\ddot{\theta}_{i+1}$, Δs in, there will be six equations that may be utilized to solve the coefficients of the polynomial function a, b, c, d, e, and f. For example, as stated above, the direction at a given point may be defined using the above quintic polynomial function:

$$\theta(s) = as^5 + bs^4 + cs^3 + ds^2 + es + f \quad (9)$$

The first order derivative of the quintic polynomial function represents a curvature at the point of the path:

$$d\theta = 5as^4 + 4bs^3 + 3cs^2 + 2ds + e \quad (10)$$

The second order derivative of the quintic polynomial function represents a curvature change rate at the point of the path:

$$d^2\theta = 20as^3 + 12bs^2 + 6cs + 2d \quad (11)$$

For a given spiral path or reference line segment, there are two points involved: a starting point and an ending point, where the direction, curvature, and curvature change rate of each point may be represented by the above three equations respectively. Thus, there are a total of six equations for each spiral path or reference line segment. These six equations may be utilized to determine the coefficients a, b, c, d, e, and f of the corresponding quintic polynomial function.

When a spiral path is utilized to represent a curve between consecutive reference points in the Cartesian space, there is a need to build a connection or bridge between the spiral path curve length and a position in the Cartesian space. Given a spiral path θi(s) defined by {θi, dθi, d2θi, θi+1, dθi+1, d2θi+1, Δs}, and path starting point pi=(xi, yi), we need to determine the coordinate of point p=(x, y) given any s=[0, Δs]. In one embodiment, the coordinates of a given point may be obtained based on the following equations (e.g., formulas, functions, etc.):

$$x = x_i + \int_0^s \cos(\theta_i(s))ds \quad (12)$$

$$y = y_i + \int_0^s \sin(\theta_i(s))ds \quad (13)$$

When s=Δs, the ending coordinates pi+1 are obtained given curve θi and starting coordinates pi=(xi, yi). The optimization of the functions are performed such that the overall output of the functions of the spiral paths reach minimum, while the above set of constraints are satisfied. In addition, the coordinates of the terminal point derived from the optimization is required to be within a predetermined range (e.g., tolerance, error margins) with respect to the corresponding coordinates of the initial reference line. That is, the difference between each optimized point and the corresponding point of the initial reference line may be within a predetermined threshold.

Figure 5B:
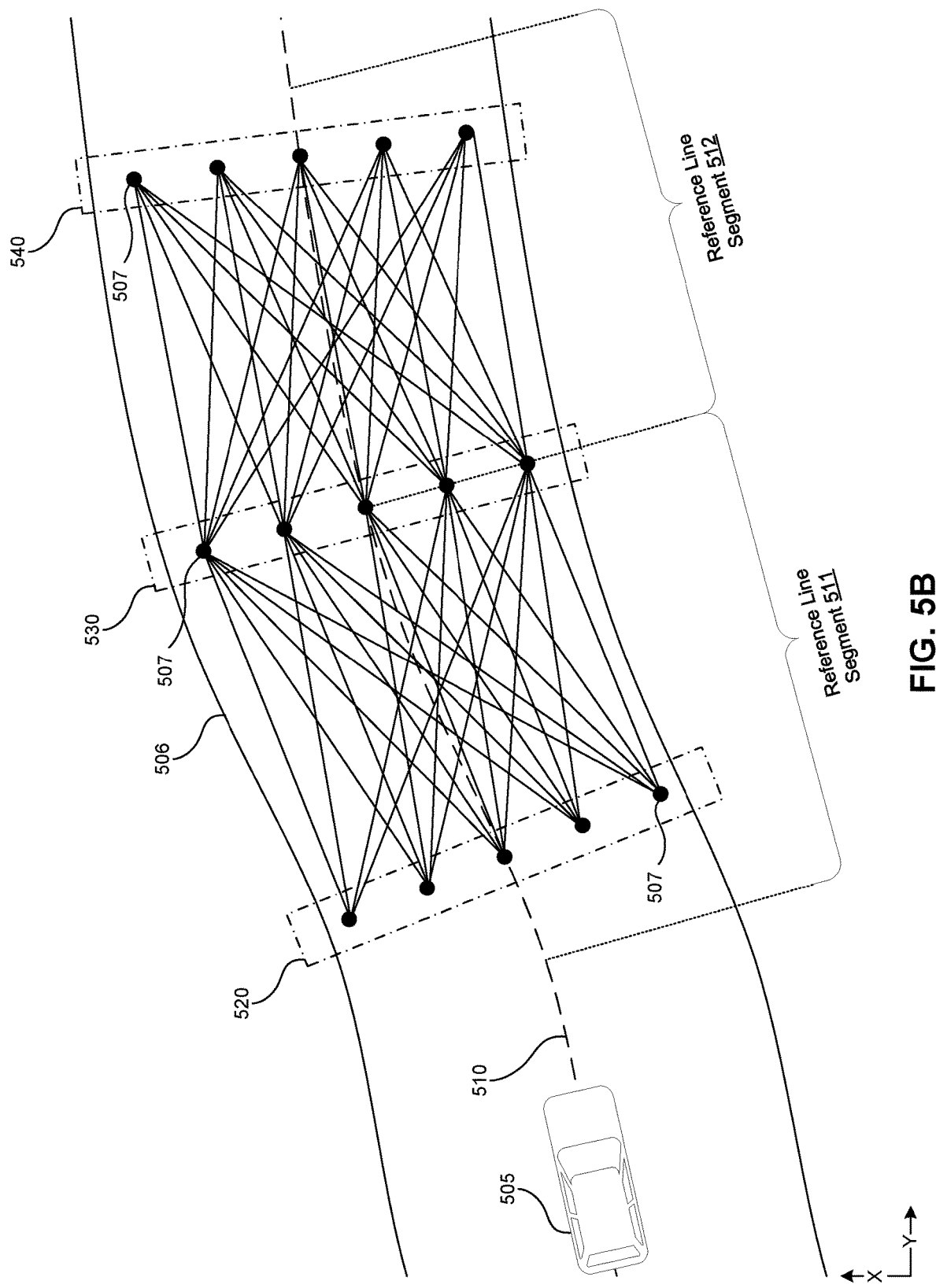
FIG. 5B is a diagram illustrating an example of an autonomous vehicle traveling down a road according to some embodiments.

FIG. 5B is a diagram illustrating an example of an ADV 505 traveling (e.g., moving, driving, etc.) down a road 506 (e.g., a street, a lane, a highway, a freeway, an expressway, etc.) according to some embodiments. As discussed above, reference line generator 405 (illustrated in FIG. 4) may generate a reference line 510. Also as discussed above, segmenter 401 (illustrated in FIG. 4) may segment the reference line 510 into reference line segment 511 and reference line segment 511. The sample point generator 503 may generate sample points 507, as discussed above. The sample points may be grouped into three sets of sample points, set 520, set 530, and set 540. The road 506, the sample points, the reference line 510, and/or other elements illustrated in FIG. 5B may be represented using a Cartesian coordinate system as illustrated by the X axis and Y-axis in FIG. 5B. The reference line 510 may be represented using one or more polynomial functions (e.g., one polynomial function for reference line segment 511 and one polynomial function for reference line segment 512), as discussed above. The polynomial functions (e.g., cubic polynomials, quintic polynomials) and the coefficients for the polynomial functions may be determined using equations (1) through (12), as discussed above.

In one embodiment, the distance between the sets 520, 530, and 540 may be based on the speed of the ADV 505. For example, the sample point generator 403 determine the distance between the sets 520, 530, and 540 based on the following equation:

$$\text{distance} = (ADV\_speed * speed\_coefficient) + min\_dist \quad (14)$$

where ADV_speed is the speed of the ADV 505, where speed_coefficient is a weight for the speed of the ADV 505, and where min_dist is a minimum distance between the sets 520, 530, and 540. The speed_coefficient and the min_dist may be configurable by a user and may allow the user to adjust the desired distance between the sets 520, 530, and 540 (e.g., set of sample points).

In one embodiment, the polynomial function generator 402 may generate segments that connect the sample points of one set of sample points, to the sample points of an adjacent set of sample points, as discussed above. As illustrated by the lines between the sample points 507 in sets 520 and 530, the polynomial function generator 402 may generate segments that connect each sample point in set 520 to each sample point in set 530. For example, the polynomial function generator 402 may generate twenty-five segments that connect the five sample points 507 in set 520, to the five sample points 507 in set 530. The polynomial function generator 402 may also generate segments (e.g., twenty-five additional segments) that connect each sample point in set 530 to each sample point in set 540, as illustrated by the lines between sample points 507 in sets 530 and 540. In some embodiments, the polynomial function generator 402 may also generate, determine, calculate, etc., polynomial functions (e.g., quintic or cubic polynomial functions) to represent or model each of the segments using equations (1) through (12), as discussed above. For example, similar to the reference line segments 511 and 512, the polynomial function generator 402 may determine a polynomial function and coefficients for the polynomial function for each segment (e.g., for each of the fifty segments illustrated in FIG. 5B).

In one embodiment, the polynomial function generator 402 may use a plurality of threads to generate the segments illustrated in FIG. 5B. For example, the polynomial function generator 402 may use five threads to generate the segments between the sample points 507 in set 520 and 530. Each thread may generate five segments for each sample point 507 in the set 520. A first thread may generate five segments for the first sample point 507 in the set 520 where each segment is connected to one of the sample points 507 in the set 530, a second thread may generate five segments for the second sample point 507 in the set 520 where each segment is connected to one of the sample points 507 in the set 530, etc. In another example, the polynomial function generator 402 may use five threads to generate the segments between the sample points 507 in set 530 and 540. Each thread may generate five segments for each sample point 507 in the set 530. A first thread may generate five segments for the first sample point 507 in the set 530 where each segment is connected to one of the sample points 507 in the set 540, a second thread may generate five segments for the second sample point 507 in the set 530 where each segment is connected to one of the sample points 507 in the set 540, etc.

In one embodiment, the threads used by the polynomial generator 402 may allow the polynomial generator 402 to generate multiple segments in parallel. For example, if five threads are used by the polynomial generator 402 to generate segments, then polynomial generator 402 may be able to generate five segments simultaneously (e.g., generate five segments in parallel). This may reduce the amount of time it takes for the polynomial generator 402 to generate the segments illustrated in FIG. 5B. For example, if five threads are used by the polynomial generator 402 to generate segments, the amount of time to generate the segments illustrated in FIG. 5B may be reduced by eighty percent (e.g., may be reduced by four-fifths).

In one embodiment, the path generator 404 may determine a path for the ADV 505 based on the segments between the sample points. The path generator 404 may determine a cost (e.g., a weight) for each of the fifty segments. The cost may be based on various factors or parameters including, but not limited to, how far away the segment is from the reference line, how far away the sample points in the segment are from the reference line, the curvature of a segment, the curvature at a sample point, the curvature at a starting point and/or ending point of a segment, the curvature change rate for a segment, the curvature change rate at a sample point, the curvature change rate at a starting point and/or an endpoint of a segment, obstacles (e.g., moving obstacles, vehicles, pedestrians, obstructions, etc.) that may be located at a sample point, etc. The path generator 404 may identify or select the segments that form a path through multiple sets of segments which also have the lowest total cost (lowest total weight).

In one embodiment, the path generator 404 may use a plurality of threads to determine the costs of the segments illustrated in FIG. 5B. For example, the path generator 404 may use five threads to determine (e.g., calculate) the costs for the segments between the sample points 507 in set 520 and 530. Each thread may determine five costs for five segments between the sample points 507 in set 520 and 530. A first thread may determine five costs for the five segments between the first sample point 507 in the set 520 and the sample points 507 in the set 530, a second thread may determine five costs for the five segments between the second sample point 507 in the set 520 and the sample points 507 in the set 530, etc. In another example, the path generator 404 may use five threads to determine (e.g., calculate) the costs for the segments between the sample points 507 in set 530 and 540. Each thread may determine five costs for five segments between the sample points 507 in set 530 and 540. A first thread may determine five costs for the five segments between the first sample point 507 in the set 530 and the sample points 507 in the set 540, a second thread may determine five costs for the five segments between the second sample point 507 in the set 530 and the sample points 507 in the set 540, etc. The cost for each segment may be referred to as a path cost or a segment cost.

In one embodiment, the threads used by the path generator 404 may allow the path generator 404 to determine multiple path costs in parallel. For example, if five threads are used by the path generator 404, then path generator 404 may be able to determine five path costs simultaneously (e.g., calculate five path costs in parallel). This may reduce the amount of time it takes for the path generator 404 to determine path costs for the segments illustrated in FIG. 5B. For example, if five threads are used by the path generator 404 to determine path costs, the amount of time to determine the path costs for the segments illustrated in FIG. 5B may be reduced by eighty percent (e.g., may be reduced by four-fifths).

In some embodiments, the path generator 404 may use dynamic programming algorithm, functions, operations, etc., to determine the path for the ADV 605. For example, the path generator 404 may use Dijkstra's algorithm to determine the path with the lowest cost for the ADV 605 based on the costs (e.g., the weights) of the segments. The path for the ADV may include one segment of the twenty-five segments between set 620 and 630, and one segment of the twenty-five segments between set 630 and set 640. If multiple paths have the same lowest cost, the path generator 404 may select one of the multiple paths based on various factors. For example, the path generator 404 may select the path that most closely follows the reference line 610 (e.g., the path that deviates the least from the reference line 610). The ADV may be controlled based on the path determined (e.g., generated) by the path generator 404. For example, the ADV may follow the path determined by the path generator 404.

In one embodiment, the speed component 407 may determine the speed for the path (determined by the path generator 404) or for one or more portions of the path, as discussed above. For example, the path may include two segments, a first segment between set 520 and set 530, and a second segment between set 530 and set 540. The speed component 407 may determine a speed for the ADV as the ADV travels along two segments that form the path. The speed component 407 may determine a first speed for the first segment between set 520 and set 530, and may determine a second speed for the second segment between set 530 and set 540.

In one embodiment, the speed component 407 may determine one or more speed costs for one or more speeds for a portion or segment of the path determined by the path generator 404. For example, the speed component 407 may determine a plurality of speed costs for a plurality of speeds for the first segment (between set 520 and set 530) of the path. This may allow the speed component 407 to determine the speed that should be used by the ADV for the portion of the path.

In one embodiment, the speed component 407 may determine the plurality of speeds that may be used by the ADV for a portion of the path. For example, the speed component 407 may determine the maximum speed of the minimum acceleration/speed for the ADV. The maximum or minimum speed for the ADV may be based on the physical capabilities or constraints of the ADV (e.g., max acceleration/speed may be based on the power of the engine of the ADV). The speed component 407 may identify a set of speeds between the maximum and minimum speed. For example, the speed component 407 may identify a set of speeds that are evenly distributed between the maximum and minimum speed. As discussed above, the speed component 407 may determine a plurality of speed costs for each of the plurality of speeds that were determined for the portion of the path. For example, the speed component 407 may determine a velocity cost, an acceleration cost, and a smoothness cost for each speed of the plurality of speeds, as discussed above.

In one embodiment, the speed component 407 may use a plurality of threads to determine the plurality of speed costs for the plurality of speeds for the portion or segment of the path. For example, if the speed component 407 determines five speeds for the portion of segment of the path, the speed component 407 may use five threads to determine (e.g., calculate, generate, etc.) a speed cost for each of the five speeds. Each thread may determine a velocity cost, acceleration cost, and smoothness cost that may be used to determine (e.g., calculate) a respective speed cost.

In one embodiment, the threads used by the speed component 407 may allow the polynomial generator 402 to generate multiple segments in parallel. For example, if five threads are used by the polynomial generator 402 to generate segments, then polynomial generator may be able to generate five segments simultaneously (e.g., generate five segments in parallel). This may reduce the amount of time it takes for the polynomial generator 402 to generate the segments illustrated in FIG. 5B. For example, if five threads are used by the polynomial generator 402 to generate segments, the amount of time to generate the segments illustrated in FIG. 5B may be reduced by eighty percent (e.g., may be reduced by four-fifths).

In one embodiment, the speed component 407 may select the speed for the portion/segment of the path with the lowest cost (e.g., the lowest sum of velocity cost, acceleration cost, and smoothness cost). For example, the speed component 407 may determine a plurality of speed costs for a plurality of speeds, and may select the speed with the lowest speed cost. In some embodiments, the speed component 407 may use dynamic programming algorithm, functions, operations, etc., to determine the speed with the lowest speed cost. If multiple speeds have the same lowest speed cost, the speed component 407 may select one of the speeds based on various factors. For example, the path generator 404 may select the speed that is closest to the current speed of the ADV. The selected speed may be used to control the ADV in conjunction with the path determined by the path generator 404. For example, the ADV may drive along the portion of the path at the selected speed.

In some embodiments, the number of threads that are initiated/allocated by the thread component 406 for the other modules/components of the planning module 305 may vary based on various factors or parameters. For example, the number of threads that are allocated by the thread component 406 to the speed component 407 may be based on the number of cores in a multi-core processor. In another example, the number of threads that are allocated by the thread component 406 to the speed component 407 may be based on the number of speeds that are determined/identified by a portion of the path. In a further example, the number of threads that are allocated that are allocated to the polynomial function generator 402 and the path generator 404 may be based on the number of sample points and/or segments.

Figure 6:
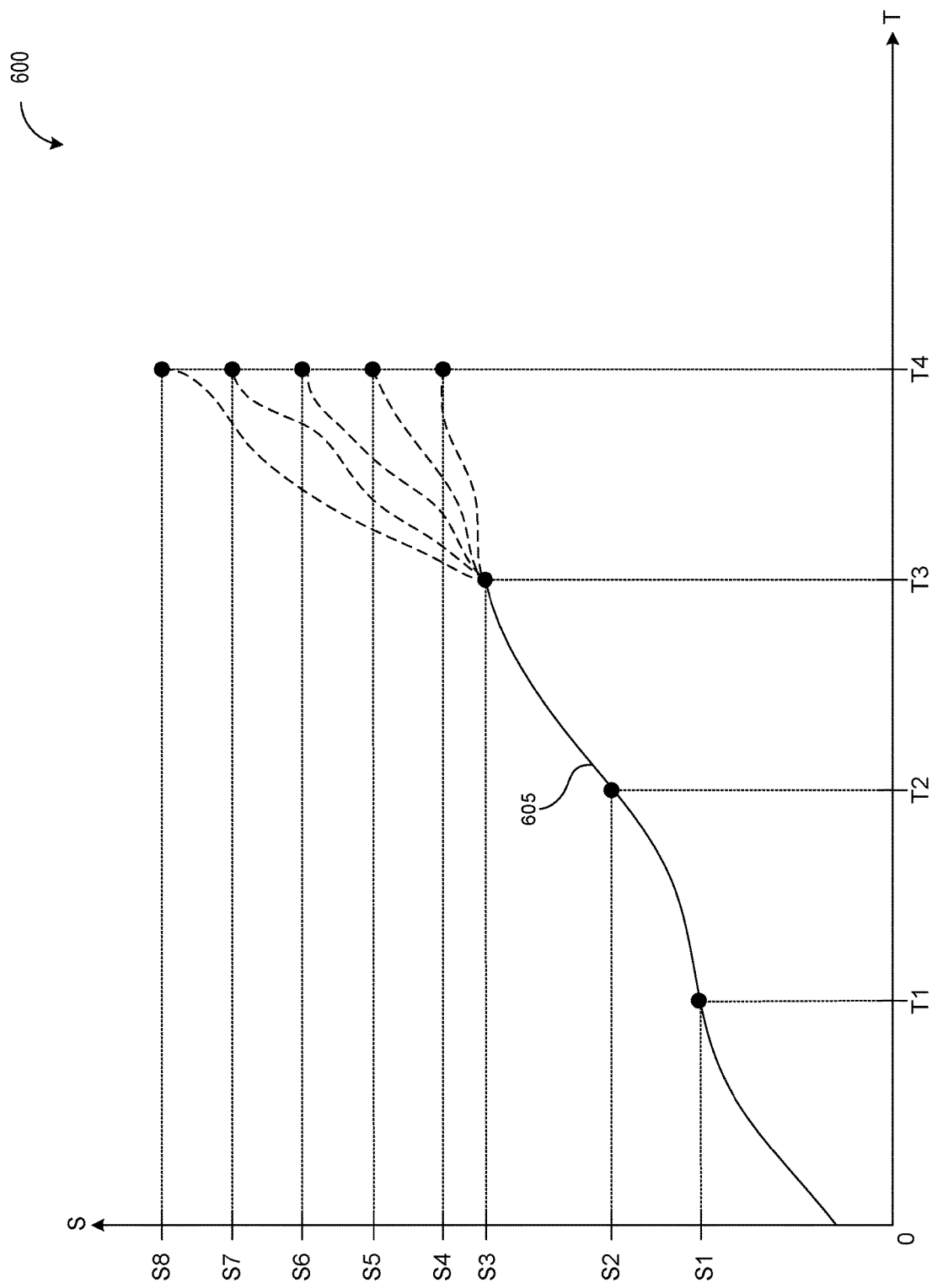
FIG. 6 illustrates an example station-time (S-T) graph according to some embodiments.

FIG. 6 illustrates an example station-time (S-T) graph 600 according to some embodiments. The S-T graph 600 includes an S-T trajectory 605. In one embodiment, S-T graph 600 may indicate a distance that may be travelled by an ADV along a path, route, reference line, etc., with respect to time. For example, the S-T trajectory 605 may indicate the distance travelled by the ADV along the path at different points in time. Each S-T coordinate along the S-T trajectory indicates the distance (e.g., S) travelled by the car at a respective point in time (e.g., T). For example, the S-T trajectory 605 may indicate that the ADV has travelled a distance of S1 at time T1. In another example, the S-T trajectory 605 may indicate that the ADV has travelled a distance of S2 at time T2. In a further example, the S-T trajectory 605 may indicate that the ADV has travelled a distance of S3 at time T3.

As discussed above, the ADV may travel at different speeds at different portions of the path. The speed of the ADV as the ADV travels along different portions of the path may be represented using the S-T trajectory 605. For example, the S-T trajectory 506 may indicate the speed of the ADV along the portion of the path that the ADV travelled during the time period T0 to T1, may indicate the speed of the ADV along the portion of the path that the ADV travelled during the time period T1 to T2, and may indicate the speed of the ADV along the portion of the path that the ADV travelled during the time period T2 to T3.

In one embodiment, the ADV may currently be at the distance S3 at time T3 and may be travelling the path until time T4. At different speeds, the ADV may travel to different distances along the path at time T4. If the ADV travels at a first speed, the ADV may travel to distance S4 at time T4. If the ADV travels at a second speed, the ADV may travel to distance S5 at time T4. If the ADV travels at a third speed, the ADV may travel to distance S6 at time T4. If the ADV travels at a fourth speed, the ADV may travel to distance S7 at time T4. If the ADV travels at a fifth speed, the ADV may travel to distance S8 at time T4. Thus, different possible S-T trajectories (represented by the dashed lines) may be added to the S-T trajectory 605 depending on which speed is selected by the ADV.

As discussed above, the ADV may determine a speed cost for each of the five speeds illustrated in FIG. 6. For each of the five speeds, the ADV may determine velocity cost, an acceleration cost, and a smoothness cost, as discussed above.

The velocity cost for the first speed may be a function of S3, T3, S4, and T4. The acceleration cost for the first acceleration may be a function of S2, T2, S3, T3, S4, and T4. The smoothness cost for the first smoothness may be a function of S1, T1, S2, T2, S3, T3, S4, and T4. The velocity cost for the second speed may be a function of S3, T3, S5, and T4. The acceleration cost for the second acceleration may be a function of S2, T2, S3, T3, S5, and T4. The smoothness cost for the second smoothness may be a function of S1, T1, S2, T2, S3, T3, S5, and T4. The velocity cost for the third speed may be a function of S3, T3, S6, and T4. The acceleration cost for the third acceleration may be a function of S2, T2, S3, T3, S6, and T4. The smoothness cost for the third smoothness may be a function of S1, T1, S2, T2, S3, T3, S6, and T4. The velocity cost for the fourth speed may be a function of S3, T3, S7, and T4. The acceleration cost for the fourth acceleration may be a function of S2, T2, S3, T3, S7, and T4. The smoothness cost for the fourth smoothness may be a function of S1, T1, S2, T2, S3, T3, S7, and T4. The velocity cost for the fifth speed may be a function of S3, T3, S8, and T4. The acceleration cost for the fifth acceleration may be a function of S2, T2, S3, T3, S8, and T4. The smoothness cost for the fifth smoothness may be a function of S1, T1, S2, T2, S3, T3, S8, and T4.

As discussed above, the ADV may determine a speed cost for each of the five speeds by adding the velocity cost, acceleration cost, and smoothness cost for each respective speed, and determine which speed has the lowest total cost (e.g., lowest total sum of velocity cost, acceleration cost, and smoothness cost). In one embodiment, the ADV may use multiple threads to determine the speed costs for each of the five speeds. For example, the ADV may use five threads in parallel, which each thread determine a speed cost for one of the five speeds. This may decrease the amount of time it takes for the ADV to determine a speed for the portion of the path.

Figure 7:
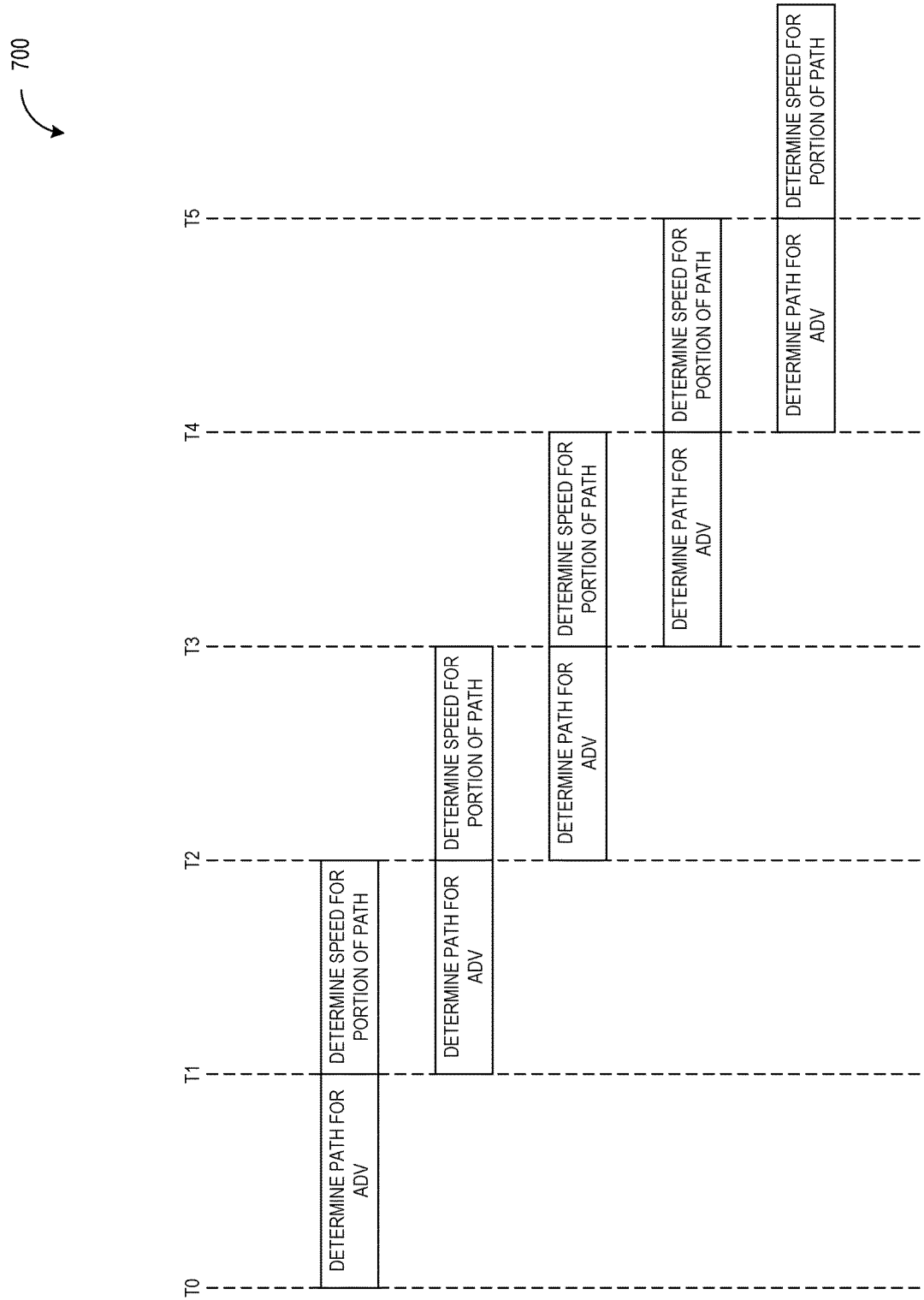
FIG. 7 illustrates an example timing diagram according to some embodiments.

FIG. 7 illustrates an example timing diagram 700 according to some embodiments. The timing diagram 700 illustrates example operations that may be performed by the ADV at different time periods. The operations may include determining a path for the ADV. For example, the ADV may determine sample points based on a reference line, generate segments between the sample points, and determine costs (E.g., path costs) for each of the segments, as discussed above. The operations may also include determine a speed for a portion of the path. For example, the ADV may determine speed costs for different speeds for the portion of the path. The ADV may determine a speed cost by determining a velocity cost, an acceleration cost, and a smoothness cost for each speed.

As discussed above, a set of threads (e.g., one or more threads) may be used to determine the path for the ADV. In some embodiments, a second (e.g., separate) set of threads may be used to determine the speed for a portion of the path for the ADV. Because separate sets of threads are used to determine the path and determine the speed for a portion of the path, both operations may be performed simultaneously (e.g., performed in parallel). For example, at time T1-T2, the ADV may determine the speed for a portion of the path (that was determined at time T0-T1 while simultaneously determine a new path for the ADV. At time T2-T3, the ADV may determine the speed of the new path (determined at time T1-T2) while simultaneously determining another new path. This may be referred to as pipelining, operation pipelining, etc.

In some embodiments, pipelining may further reduce the amount of time it takes for the ADV to determine a path and determine speeds for different portions of the path. For example, using different sets of threads may reduce the amount of time it takes to perform an operation (e.g., to determine a path or determine a speed for a portion of the path) by allowing multiple parts of the operation to be performed simultaneously or in parallel, as discussed above. Pipelining the operations may further reduce the amount of time it takes to perform the operations because multiple operations may be performed in parallel.

Figure 8:
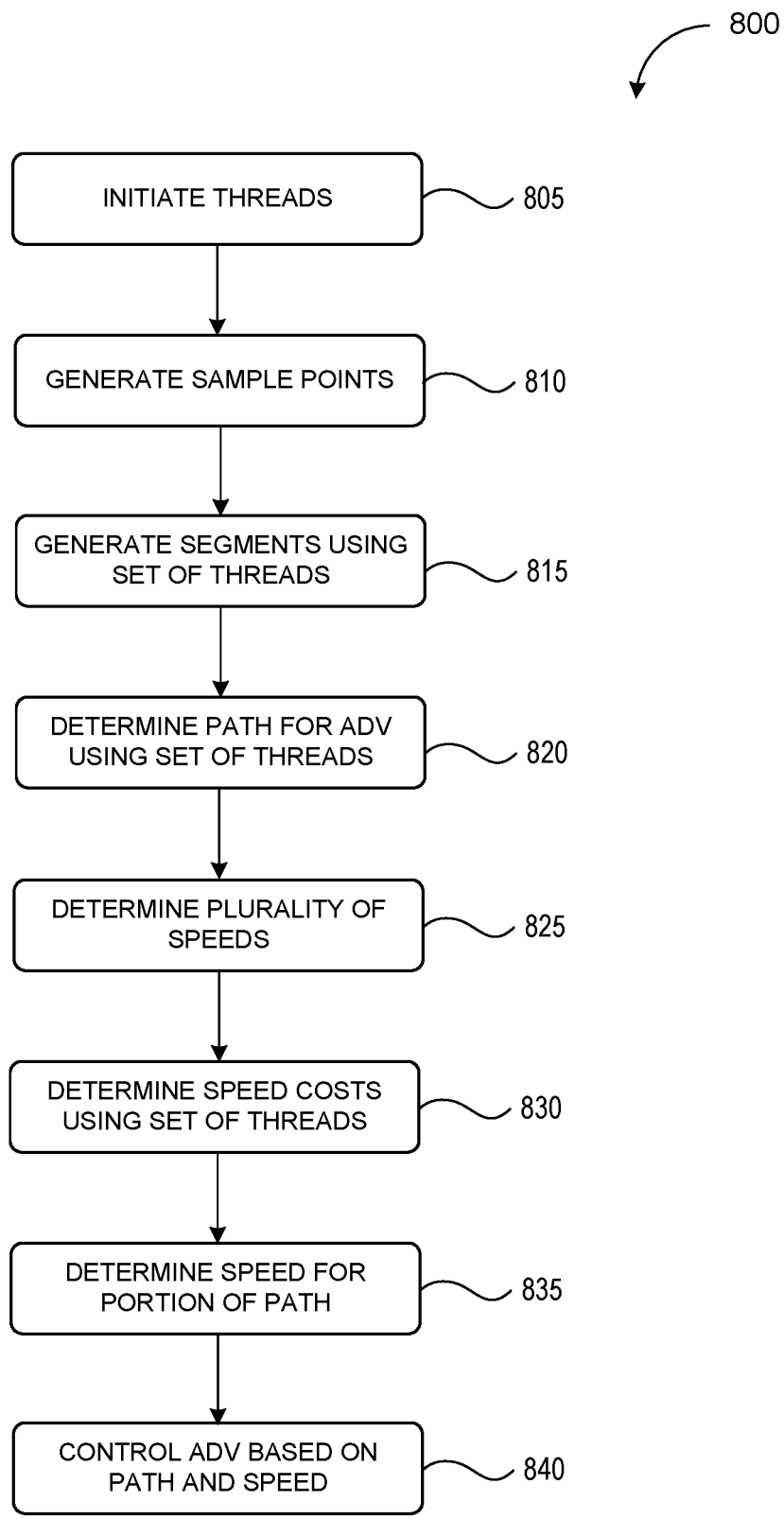
FIG. 8 is a flow diagram illustrating an example of process for determining a path for an autonomous vehicle according to some embodiments.

FIG. 8 is a flow diagram illustrating an example of process 800 for determining a path for an autonomous vehicle (e.g., an ADV) according to some embodiments. Process 800 may be performed by processing logic which may include software, hardware, or a combination thereof. Process 800 may be performed by processing logic that may comprise hardware (e.g., circuitry, dedicated logic, programmable logic, a processor, a core of a multi-core processing, a processing device, a central processing unit (CPU), a system-on-chip (SoC), etc.), software (e.g., instructions running/executing on a processing device), firmware (e.g., microcode), or a combination thereof. In some embodiments, process 800 may be performed by one or more of decision module 304 and planning module 305, illustrated in FIGS. 3B and 4C. Referring to FIG. 8, at block 805, the processing logic may initiate or allocate multiple threads that may be used by the processing logic. For example, the processing logic may spawn multiple threads (or processes). At block 810, the processing logic may generate sample points. For example, the processing logic may generate multiple sets of sample points, as discussed above.

The processing logic may generate segments using a set of threads at block 815. For example, the processing logic may execute the set of threads to generate the segments. Each thread may generate a that connects a sample point in first set of example points a sample point in an adjacent set of sample points, as discussed above. At block 820, the processing logic may determine the path or the ADV using the set of threads (or a separate set of threads). For example, the processing logic may execute the set of threads to determine a plurality of costs (e.g., path costs) for the segments. Each thread may determine a cost for one segment, as discussed above. The processing logic may use dynamic programming to select a subset of segments for use in the path.

At block 825, the processing logic 825 may determine a plurality of speeds for a portion of path. For example, the processing logic 825 may select a plurality of speeds in between a maximum speed and a minimum speed, as discussed above. The processing logic may determine speed costs using a set of threads at block 830. For example, each thread may determine a speed cost for a respective speed by determine a respective velocity cost, a respective acceleration cost, and a respective smoothness cost, as discussed above. At block 835, the processing logic may determine a speed for a portion of the path. For example, the processing logic may select the speed with the lowest speed costs, as discussed above. The processing logic may control the ADV based on the path and the speed at block 840. For example, the ADV may travel along the path determined by the processing logic and may travel at the speed determined by the processing logic for the portion of the path.

In some embodiments, multiple instances of process 800 may be performed in parallel. For example, while a first instance of process 800 is perform blockings 825 through 835, a second instance of processing 800 may perform blocks 810 through 820, as discussed above in conjunction with FIG. 7.

Note that some or all of the components as shown and described above may be implemented in software, hardware, or a combination thereof. For example, such components may be implemented as software installed and stored in a persistent storage device, which may be loaded and executed in a memory by a processor (not shown) to carry out the processes or operations described throughout this application. Alternatively, such components may be implemented as executable code programmed or embedded into dedicated hardware such as an integrated circuit (e.g., an application specific IC or ASIC), a digital signal processor (DSP), or a field programmable gate array (FPGA), which may be accessed via a corresponding driver and/or operating system from an application. Furthermore, such components may be implemented as specific hardware logic in a processor or processor core (of a multi-core processor) as part of an instruction set accessible by a software component via one or more specific instructions.

Figure 9:
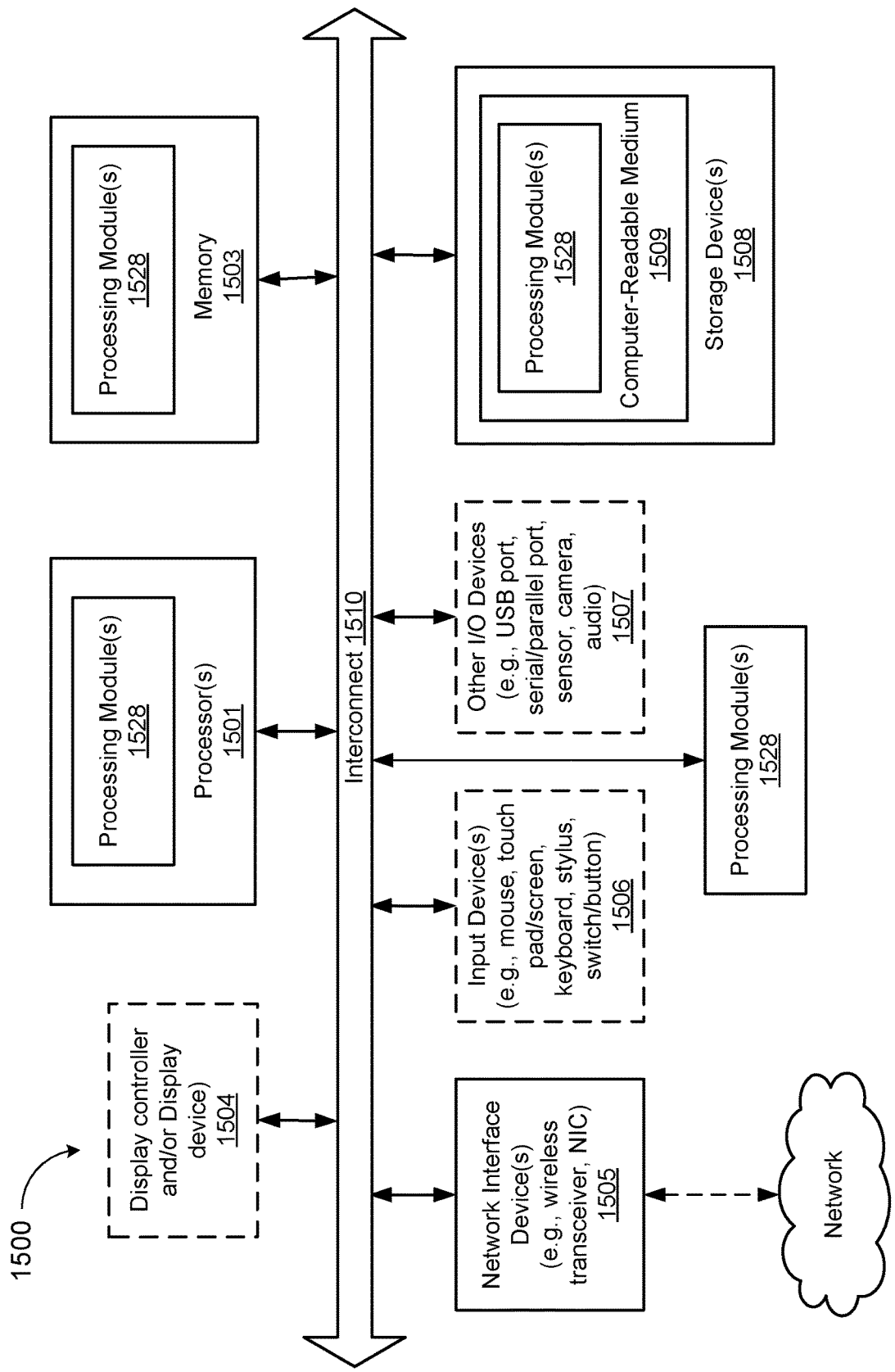
FIG. 9 is a block diagram illustrating a data processing system according to some embodiments.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/ logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of operating an autonomous driving vehicle, the method comprising:
    generating multiple sets of sample points based on a first reference line representing a route from a first location to a second location, wherein the route is associated with an autonomous driving vehicle (ADV);
    executing a first plurality of threads, comprising:
        generating a plurality of segments simultaneously between the multiple sets of sample points to reduce an amount of time to generate the plurality of segments, wherein each thread of the first plurality of threads is configured to generate a segment of the plurality of segments; and
        determining a path for the autonomous driving vehicle based on the plurality of segments, wherein the path comprises one sample point from each of the multiple sets of sample points;
    controlling the autonomous driving vehicle based on the path.

2. The method of claim 1, wherein determining the path for the autonomous driving vehicle comprises:
    determining a plurality of path costs for the plurality of segments, wherein each thread of the first plurality of threads is further configured to determine a path cost of the plurality of path costs; and
    determining the path further based on the plurality of path costs.

3. The method of claim 1, further comprising:
    executing a second plurality of threads configured to:
        determine a plurality of speeds for a portion of the path;
        determine a plurality of speed costs for the plurality of speeds, wherein each thread of the second plurality of threads is further configured to determine a speed cost of the plurality of speed costs;
determine a speed for the portion of the path; and
controlling the autonomous driving vehicle further based on the speed.

4. The method of claim 3, wherein the plurality of speed costs are determined based on one or more of:
a plurality of velocity costs;
a plurality of acceleration costs; or
a plurality of smoothness costs.

5. The method of claim 1, wherein generating the multiple sets of sample points comprises:
determining a distance between each of the multiple sets of sample points based on a speed of the ADV.

6. The method of claim 1, wherein generating the plurality of segments between the multiple sets of sample points comprises:
connecting each sample point in a set of sample points to each sample point in an adjacent set of sample points.

7. The method of claim 1, wherein generating the plurality of segments between the multiple sets of sample points comprises:
determining a plurality of polynomial functions for the plurality of segments, wherein each polynomial function represents one segment of the plurality of segments.

8. The method of claim 7, wherein coefficients of each polynomial function are determined based on one or more of a location of the ADV, a direction of the ADV, a curvature of the ADV, or a curvature change rate of the ADV associated with a respective segment.

9. The method of claim 7, wherein each polynomial function comprises a quintic polynomial function or a cubic polynomial function.

10. A non-transitory machine-readable medium having instructions stored therein, which when executed by a processor, cause the processor to perform operations, the operations comprising:
generating multiple sets of sample points based on a first reference line representing a route from a first location to a second location, wherein the route is associated with an autonomous driving vehicle (ADV);
executing a first plurality of threads, comprising:
generating a plurality of segments simultaneously between the multiple sets of sample points to reduce an amount of time to generate the plurality of segments, wherein each thread of the first plurality of threads is configured to generate a segment of the plurality of segments; and
determining a path for the autonomous driving vehicle based on the plurality of segment, wherein the path comprises one sample point from each of the multiple sets of sample points;
controlling the autonomous driving vehicle based on the path.

11. The non-transitory machine-readable medium of claim 10, wherein determining the path for the autonomous driving vehicle comprises:
determining a plurality of path costs for the plurality of segments, wherein each thread of the first plurality of threads is further configured to determine a path cost of the plurality of path costs; and
determining the path further based on the plurality of path costs.

12. The non-transitory machine-readable medium of claim 10, wherein the operations further comprise:
executing a second plurality of threads configured to:
determine a plurality of speeds for a portion of the path;
determine a plurality of speed costs for the plurality of speeds, wherein each thread of the second plurality of threads is further configured to determine a speed cost of the plurality of speed costs;
determine a speed for the portion of the path; and
controlling the autonomous driving vehicle further based on the speed.

13. The non-transitory machine-readable medium of claim 12, wherein the plurality of speed costs are determined based on one or more of:
a plurality of velocity costs;
a plurality of acceleration costs; or
a plurality of smoothness costs.

14. The non-transitory machine-readable medium of claim 10, wherein generating the multiple sets of sample points comprises:
determining a distance between each of the multiple sets of sample points based on a speed of the ADV.

15. The non-transitory machine-readable medium of claim 10, wherein generating the plurality of segments between the multiple sets of sample points comprises:
connecting each sample point in a set of sample points to each sample point in an adjacent set of sample points.

16. The non-transitory machine-readable medium of claim 10, wherein generating the plurality of segments between the multiple sets of sample points comprises:
determining a plurality of polynomial functions for the plurality of segments, wherein each polynomial function represents one segment of the plurality of segments.

17. The non-transitory machine-readable medium of claim 16, wherein coefficients of each polynomial function are determined based on one or more of a location of the ADV, a direction of the ADV, a curvature of the ADV, or a curvature change rate of the ADV associated with a respective segment.

18. The non-transitory machine-readable medium of claim 16, wherein each polynomial function comprises a quintic polynomial function or a cubic polynomial function.

19. A data processing system, comprising:
a processor; and
a memory coupled to the processor to store instructions, which when executed by the processor, cause the processor to perform operations, the operations comprising:
generating multiple sets of sample points based on a first reference line representing a route from a first location to a second location, wherein the route is associated with an autonomous driving vehicle (ADV);
executing a first plurality of threads, comprising:
generating a plurality of segments simultaneously between the multiple sets of sample points to reduce an amount of time to generate the plurality of segments, wherein each thread of the first plurality of threads is configured to generate a segment of the plurality of segments; and
determining a path for the autonomous driving vehicle based on the plurality of segment, wherein the path comprises one sample point from each of the multiple sets of sample points;
controlling the autonomous driving vehicle based on the path.

20. The data processing system of claim 19, wherein the operations further comprise:

executing a second plurality of threads configured to:
  determine a plurality of speeds for a portion of the path;
  determine a plurality of speed costs for the plurality of speeds, wherein each thread of the second plurality of threads is further configured to determine a speed cost of the plurality of speed costs;
  determine a speed for the portion of the path; and
  controlling the autonomous driving vehicle further based on the speed.

\* \* \* \* \*